United States Patent [19]

Jacob et al.

[11] 4,030,772

[45] June 21, 1977

[54] FRAME

[75] Inventors: Friedrich Jacob, Steimke; Dieter Morsch, Braunschweig, both of Germany

[73] Assignee: Volkswagenwerk Aktiengesellschaft, Wolfsburg, Germany

[22] Filed: Oct. 21, 1975

[21] Appl. No.: 624,571

[30] Foreign Application Priority Data

Oct. 25, 1974 Germany .......................... 2450763

[52] U.S. Cl. ........................... 280/106 R; 296/28 F
[51] Int. Cl.[2] ......................................... B62D 21/00
[58] Field of Search .................... 280/106; 296/28 F

[56] References Cited

UNITED STATES PATENTS

| | | | |
|---|---|---|---|
| 2,126,607 | 8/1938 | Boehner | 280/106 R |
| 2,292,646 | 8/1942 | McIntosh | 280/106 R |
| 2,711,340 | 6/1955 | Lindsay | 280/106 R |

FOREIGN PATENTS OR APPLICATIONS

| | | | |
|---|---|---|---|
| 1,074,416 | 1/1960 | Germany | 296/28 F |

*Primary Examiner*—Philip Goodman
*Attorney, Agent, or Firm*—Spencer & Kaye

[57] ABSTRACT

A frame for a vehicle having two side members, two longitudinal members and two cross members. Each side member extends between a respective front wheel and rear wheel, and the two longitudinal members are arranged in at least one end region of the vehicle and, throughout at least portions of their lengths, are laterally displaced with respect to the side members in the direction toward the longitudinal axis of the vehicle. The cross members extend in opposite directions from the longitudinal propeller shaft tunnel of the vehicle and have projecting portions extending into the end region of the vehicle, these projecting portions supporting downwardly inclined ends of respective ones of the longitudinal members. The cross members are force-transmittingly connected with the tunnel, with the corresponding side members, and with a base plate, and are provided with attachments for supporting an axle mount.

7 Claims, 4 Drawing Figures

FRAME

BACKGROUND OF THE INVENTION

The present invention relates to the bottom frame of a vehicle particularly a motor vehicle. As is well known in the art, the frame is the basic structure of most motor vehicles andhas mounted upon it or attached to it the power plant, the power train and the body or other seat for the driver and occupants. The frame itself is normally supported by the suspension and must be sufficiently strong and rigid so as to enable it to withstand the various forces to which it is subjected in normal operation.

More particularly, the present invention relates to a motor vehicle frame which is made up of two side members which extend in the longitudinal direction of the vehicle and are located between a respective front wheel and rear wheel of the vehicle, two longitudinal members which are arranged in at least one end region of the vehicle and which, throughout their lengths, are laterally displaced with respect to the side members in the direction toward the longitudinal axis of the vehicle, and two cross members which extend in opposite directions from the generally centrally arranged, longitudinally extending propeller shaft tunnel, these cross members having projecting portions extending into the mentioned end region of the vehicle, which projecting portions serve as a support for the corresponding longitudinal member.

German Patent Application (Auslegeschrift) No. 1,430,738, published Mar. 11, 1971, shows a construction of this type in which those ends of the longitudinal members which are directed toward the side members are downwardly offset and, in the region of the bottom plate, extend parallel to the side members. The cross members have a relatively small cross section and extend, in longitudinal cross section through the vehicle, through only a small upper region of the longitudinal members. Because of this difference in elevation between the cross members and the side members, an additional hollow girder has to be provided on each side of the vehicle, each extending vertically between the outer end of each cross member and the corresponding side member.

The above-described construction has a number of significant drawbacks. For one thing, whenever a load supporting member is displaced in a direction transverse to the longitudinal direction of the vehicle, and this includes the vertical displacement of the cross members with respect to the side members, additional carrier members are needed which are suitably configured and supported so as to enable them to take up bending moments. Moreover, when the longitudinal members extend to the other side of the cross-sectional plane of the cross members, this takes up space in the region of the bottom plate. If, as a result, the longitudinal members are located below the bottom plate, the ground clearance of the vehicle is reduced, whereas if the longitudinal members are placed above the bottom plate, they extend into the passenger compartment. If the vehicle end region in question is the front end, the relatively high position of the cross members makes it difficult to accommodate the steering components.

BRIEF SUMMARY OF THE INVENTION

It is, therefore, the primary object of the present invention to provide a vehicle frame of the above type in which the above-described drawbacks are avoided, without, however, reducing the strength of the frame.

In accordance with the present invention, this object is achieved by providing the longitudinal members with downwardly inclined ends which are supported on the cross members, the latter being force-transmittingly connected with the longitudinally extending propeller shaft tunnel as well as with the corresponding side member and the bottom plate which extends between these parts, i.e., between the tunnel and side members. In addition, the cross members are provided with attachments for supporting an axle mount.

Figure 1:
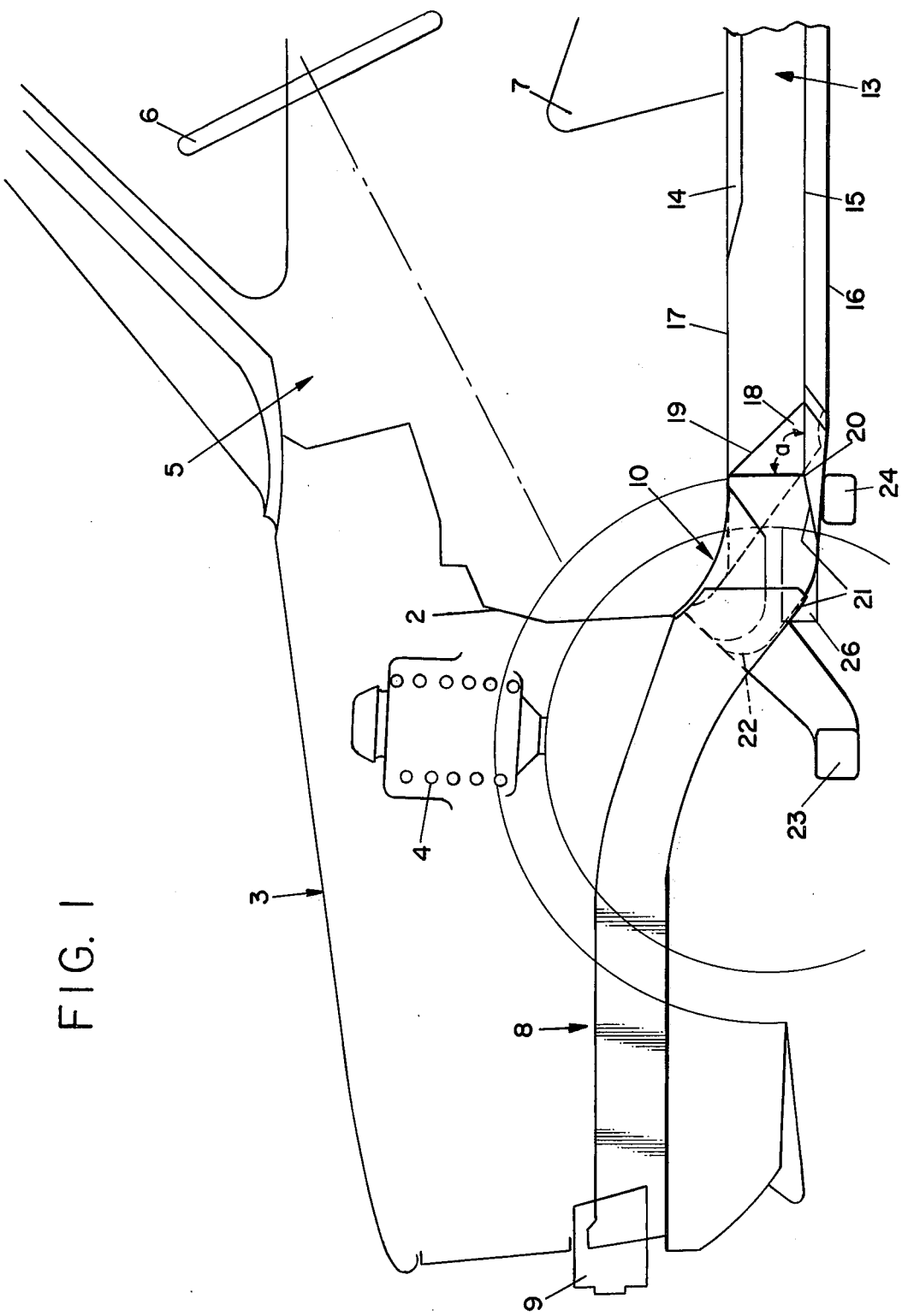
FIG. 1 is a side elevational view showing the left side of the front half of a vehicle frame according to the present invention.

Referring now to the drawings, the same show the front cross wall 2 which divides the body into the forward compartment 3 and the passenger compartment 5. The former contains the engine, the accessories usually found within the forward engine compartment, and the front axle together with its shock absorbers 4, and the passenger compartment 5 is shown as containing the steering wheel 6 and the front seat 7.

The major components of the bottom frame of the vehicle, in the region of the forward compartment 3, are the two longitudinal members, one of which is shown at 8 in FIG. 1. The forward end of the member 8 carries the bumper 9. If desired, the longitudinal members can be deformable so as to serve as shock-absorbing elements, in a manner known in the art.

The rear ends of the longitudinal members are supported by two respective cross members, which are in the form of box girders, of which only the left cross member is shown at 10. Suitable welding tongues 11 and 11a are provided at the rear of the members 8 so as to allow these longitudinal members to be welded to the respective cross members. The frame further comprises respective side members 12 which are arranged next to the cross members, the member 12 being shown as cut away in FIG. 1. Also provided are a bottom plate 13 and a longitudinally extending propeller shaft tunnel 14.

As best illustrated in FIG. 1, at least the rear end portion of the longitudinal member 8, the cross member 10, the side member 12, the bottom plate 13, and the propeller shaft tunnel 14 are arranged at least approximately at the same level. The edge 15 of the bottom plate 13 which lies next to the side member 12 is welded thereto. Beginning at this level, the bottom plate is at first inclined downwardly, in the direction of the propeller shaft tunnel 14, until it reaches its lowest level at 16, the bottom plate having, at this level, a longitudinally extending crease. The bottom plate then continues and inclines upwardly until it reaches its maximum level at 17.

At least the rearward region of the cross member 10, namely, the region which faces the passenger compartment 5, is matched to the above-described configuration of the bottom plate 13. The outer cross section of the cross member 10 is shown at 18, where it has at least approximately the form of an isosceles triangle whose apex angle $a$ is at least approximately 90°. As shown in FIG. 1, the apex of this triangle is at the front and bottom. The cross member is closed off by the inclined, upwardly bent forward end region 19 of the bottom plate 13 and is welded thereto. This arrangement allows for sufficient room to establish the welded connection between the cross member and the adjacent part of the bottom plate. As the length of the cross member moves toward the tunnel 14, the apex of this triangular cross section moves along the line 21, which itself is part of the forwardly extending region 22. In this region, the cross section of the cross member 10, taken in a longitudinal plane of the vehicle, is at least approximately trapezoidal, which is particularly well suited for enabling the cross member to take up the forces coming from the longitudinal member 8. This is so as this allows an end of the longitudinal member to encompass a forward edge of the trapezoid, which is generally well rounded off.

Also shown are the attachment points 23 and 24 for an axle mount, such as a triangular steering linkage (not shown), for the left front wheel 25, these attachment points being themselves rigidly connected to the cross member 10. The region 17 of the tunnel 14 may, if desired, carry a rear motor mount 26.

The cross member 10 shown in the drawings, as well as the non-illustrated cross member on the right side of the vehicle, lie in essentially the same plane as the side members 12, the propeller shaft tunnel 14 and the bottom plate 13, these parts being rigidly connected so that bending moments can arise only by changes in the level within the longitudinal carrier members. It is, therefore, not necessary to provide additional connecting members, such as might otherwise be needed between the cross member and the corresponding side member.

Figure 2:
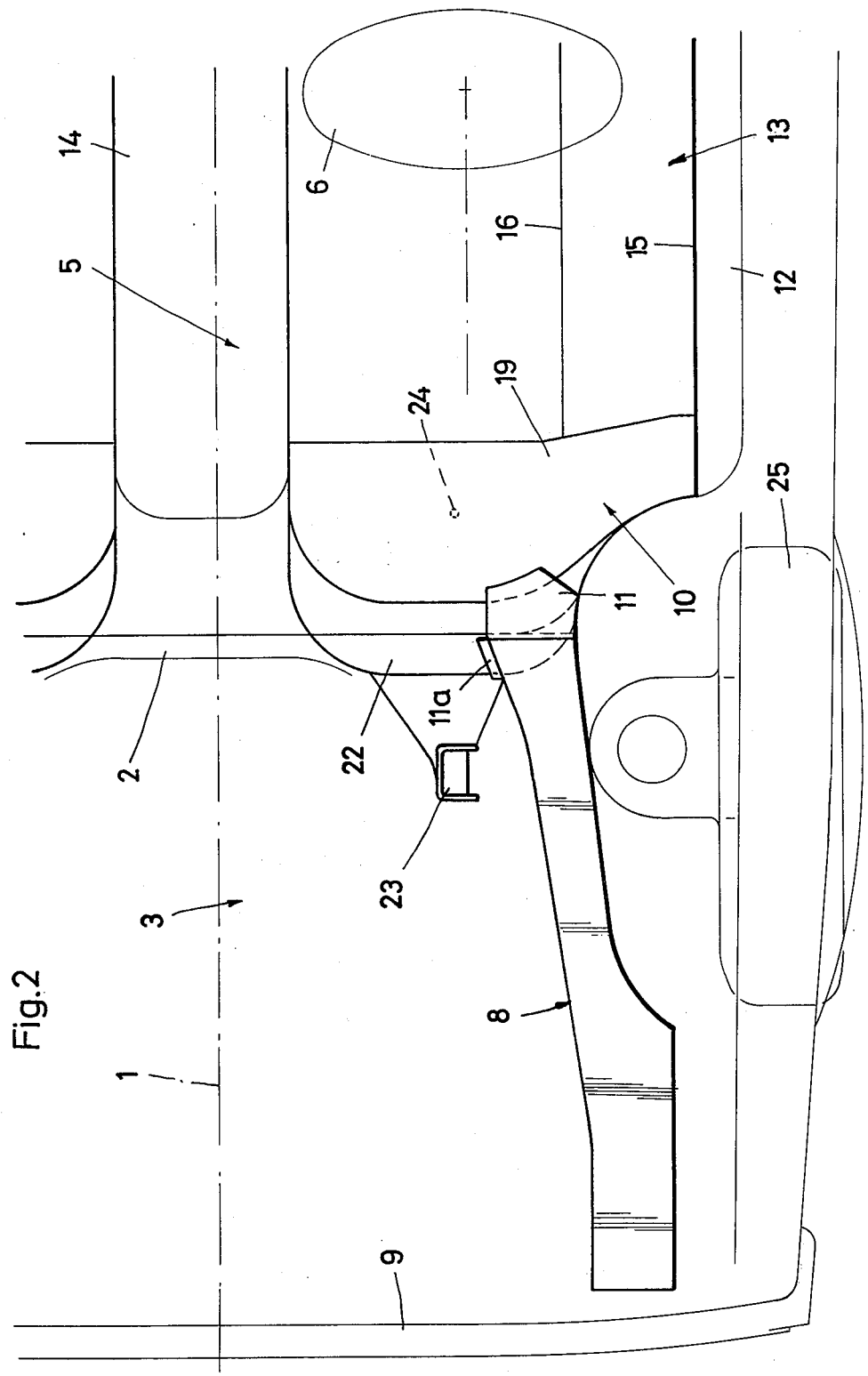
FIG. 2 is a top plan view of the structure shown in FIG. 1. For the sake of simplicity, the right-hand side of the front-end of the frame is not illustrated; in practice, it will be a mirror-image with respect to the longitudinal axis 1 of the vehicle and would, if illustrated, lie above this axis as viewed in FIG. 2.
Figure 3:
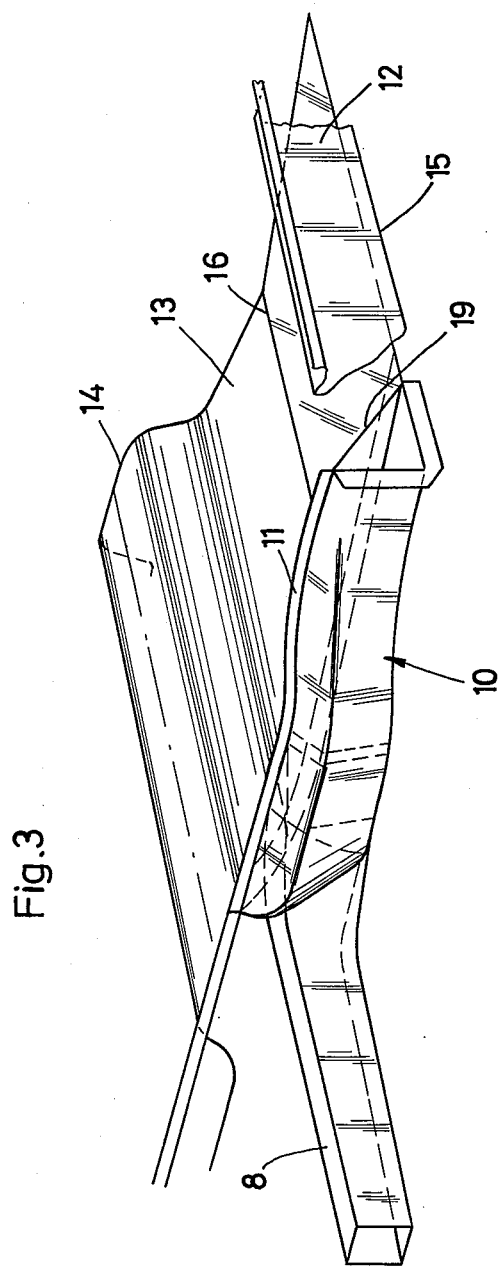
FIG. 3 is a perspective view of the embodiment shown in FIGS. 1 and 2.
Figure 4:
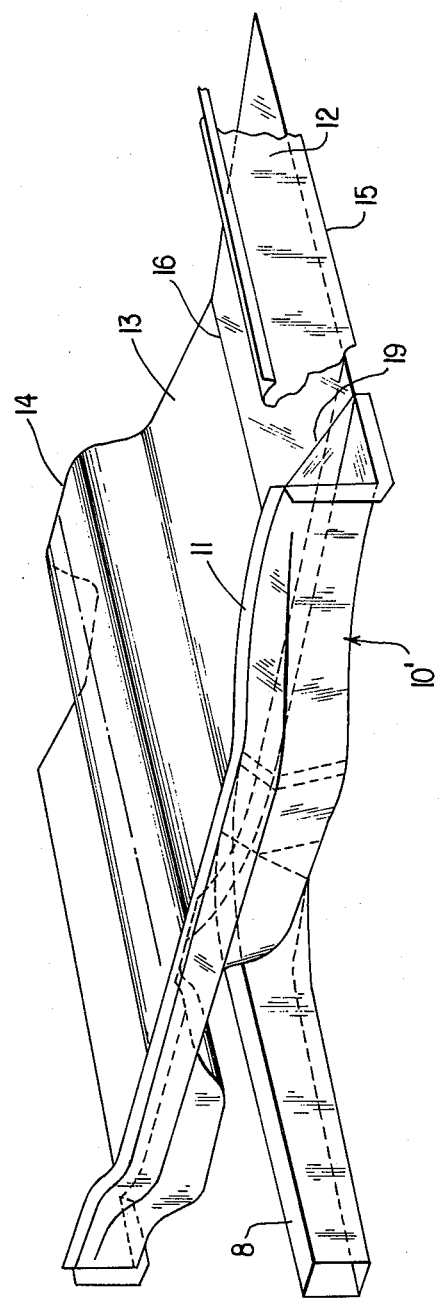
FIG. 4 is a perspective view similar to that of FIG. 3 but shows a modified embodiment of a structure according to the present invention.

The cross member 10 has a relatively large volume and can, therefore, easily be provided with internal reinforcements. The two cross members 10 can, as shown in FIGS. 1 to 3 of the drawing, be separate components, or they can be made of one piece 10' as shown in FIG. 4.

It will thus be seen that, in accordance with the present invention, there is provided a bottom frame for a vehicle, particularly a motor vehicle, having means forming two side members 12 each extending between a respective front wheel and rear wheel, means forming two longitudinal members 8 arranged in at least one end region of the vehicle, these longitudinal members, throughout their lengths, being laterally displaced with respect to the side members 12 in the direction toward the longitudinal axis 1 of the vehicle and having downwardly inclined ends, and means forming two cross members 10 which extend in opposite directions from the generally centrally located longitudinal propeller shaft tunnel 14. The cross members 10 have projecting portions extending into the end region of the vehicle — this being, in the illustrated embodiment, the front end of the vehicle—and support the downwardly inclined ends of the longitudinal members. The cross members are force-transmittingly connected with the tunnel 14, with the corresponding side members 12, and with the means which form the bottom plate 13 that extends from the tunnel to each of the side members.

It will be appreciated from the above that whereas in the prior art frame the longitudinal members extend to the other side of the plane of the cross members and, after a downward off-set, continue at the bottom of the vehicle to reach the longitudinal region occupied by the passenger compartment, the longitudinal members incorporated in the frame according to the present invention terminate at the cross members, which themselves can, therefore, be arranged relatively low. And since the cross members lie generally at the same level as the side member, there is no difficulty in letting the cross member support the longitudinal members directly, without the intermediary of any supplemental girders. In this way, each cross member forms a supporting bridge, for the forces transmitted from any one longitudinal member, between the centrally arranged propeller shaft tunnel and the respective side member. Here, the cross members are supported not only by the tunnel and the respective side member, but additionally by the bottom plate which, as is conventional, extends between the tunnel and the side members. Thanks to the fact that all of the carrier members lie substantially in one plane, as well as to the fact that the cross members are supported not only at their ends but are supported throughout their lengths by the bottom plate, the entire frame structure is well able to resist any bending moments. It is true that in practice the longitudinal members will usually extend somewhat upwardly, beginning from their ends which are supported on the cross members, so as to provide space for axle mounts and the like, but this difference in height is relatively small and can be compensated for, insofar as the generation of bending moments is concerned, by providing the cross members with an appropriate cross section and by rigidly connecting their ends with the respective side member and the longitudinal tunnel.

The present invention has the additional advantage that due to the relative low level of the cross members, the same leave space not only to accommodate the steering mechanism, but also that they can be provided with the above-described attachments 23, 24 for the axle mount.

It will be understood that the above description of the present invention is susceptible to various modifications, changes and adaptations, and the same are intended to be comprehended within the meaning and range of equivalents of the appended claims.

What is claimed is:

1. A frame for a vehicle, particularly a motor vehicle, the frame having
   a. means forming two side members each extending between a respective front wheel and rear wheel of the vehicle;
   b. means forming two longitudinal members arranged in at least one end region of the vehicle, said longitudinal members, throughout at least portions of their lengths, being laterally displaced with respect to the side members in the direction toward the longitudinal axis of the vehicle, said longitudinal members having downwardly inclined ends;
   c. means forming a central longitudinal propeller shaft tunnel;
   d. means forming two cross members which extend in opposite directions from said longitudinal propeller shaft tunnel of the vehicle, said cross members having projecting portions extending into said end region of the vehicle and supporting said downwardly inclined ends of respective ones of said longitudinal members;

e. means forming a bottom plate extending from said tunnel to each of said side members; and f. said cross members being force-transmittingly connected with said tunnel, with the corresponding side members, and with said bottom plate, and being provided with attachments for supporting an axle mount.

2. A frame as defined in claim 1, wherein each cross member is closed off by an upwardly inclined, bent over end part of said bottom plate.

3. A frame as defined in claim 2, wherein each cross member has, throughout substantially its length, a section which, taken in a longitudinal plane of the vehicle, is at least approximately trapezoidal.

4. A frame as defined in claim 1, wherein said cross members are box girders.

5. A frame as defined in claim 1, wherein at least said downwardly inclined ends of said longitudinal members, said cross members, said side members, said bottom plate, and said propeller shaft tunnel are arranged at least approximately at the same level.

6. A frame as defined in claim 1, wherein said means forming said two cross members are constituted by separate components each of which serves as a respective one of said two cross members.

7. A frame as defined in claim 1, wherein said means forming said two cross members are constituted by one piece.

* * * * *